US012689683B2

(12) United States Patent
Lawson et al.

(10) Patent No.: US 12,689,683 B2
(45) Date of Patent: Jul. 21, 2026

(54) CONTENT MANAGEMENT AND DELIVERY FOR A COMMUNICATION CHANNEL

(71) Applicant: SUBFLOW, INC., Franklin, TN (US)

(72) Inventors: Mitchell Lawson, Franklin, TN (US); William Golden, Nashville, TN (US)

(73) Assignee: SUBFLOW, INC., Franklin, TN (US)

( * ) Notice: Subject to any disclaimer, the term of this patent is extended or adjusted under 35 U.S.C. 154(b) by 0 days.

(21) Appl. No.: 18/236,292

(22) Filed: Aug. 21, 2023

(65) Prior Publication Data

US 2025/0071076 A1     Feb. 27, 2025

(51) Int. Cl.
H04L 67/55     (2022.01)
H04L 51/18     (2022.01)

(52) U.S. Cl.
CPC .............. H04L 67/55 (2022.05); H04L 51/18 (2013.01)

(58) Field of Classification Search
CPC ......... H04L 51/07; H04L 51/18; H04L 51/21; H04L 51/216; H04L 51/224; H04L 51/234; H04L 51/52; H04L 67/55; H04L 51/04; H04L 51/046; H04L 51/08; H04L 67/1396; H04L 67/535; G06Q 50/01; G06Q 10/107; G06Q 10/109; G16H 10/00; G16H 10/20; G16H 10/60; G16H 20/00; G16H 20/10; G16H 20/30
See application file for complete search history.

(56) References Cited

U.S. PATENT DOCUMENTS

| | | | | |
|---|---|---|---|---|
| 9,952,748 | B1 * | 4/2018 | Lewis ................ | H04N 21/2743 |
| 2006/0004762 | A1 * | 1/2006 | Berning ................. | G16H 10/60 |
| | | | | 707/999.009 |
| 2008/0077867 | A1 * | 3/2008 | Hake ................. | H04N 21/2743 |
| | | | | 348/E7.071 |
| 2008/0270906 | A1 * | 10/2008 | Reddy ................... | G06F 16/955 |
| | | | | 715/733 |
| 2008/0307311 | A1 * | 12/2008 | Eyal ........................ | H04L 67/52 |
| | | | | 707/999.102 |
| 2011/0059730 | A1 * | 3/2011 | Scriven ................... | H04L 51/52 |
| | | | | 455/414.1 |
| 2011/0131060 | A1 * | 6/2011 | Schuster ................ | G16H 10/60 |
| | | | | 705/3 |

(Continued)

OTHER PUBLICATIONS

Disclosed Without Attribution. "Methods, Systems, and Media for Messaging Targeted users." IP.com Prior Art Database. May 16, 2014 (Year: 2014).*

(Continued)

*Primary Examiner* — Vivek Srivastava
*Assistant Examiner* — William C Mcbeth
(74) *Attorney, Agent, or Firm* — Dickinson Wright PLLC

(57) ABSTRACT

A method for managing and delivering content associated with a communication channel is disclosed. The method may include uploading multiple pieces of content to a server. The method may further include sending messages to corresponding subscribers to the communication channel. The messages may include links to a given piece of content uploaded to the server. The method may also include monitoring access to a particular piece of content uploaded to the server and, in response to determining that the particular piece of content has been accessed, sending a follow-up message to a particular subscriber who accessed the particular piece of content.

14 Claims, 12 Drawing Sheets

*600*

(56) References Cited

U.S. PATENT DOCUMENTS

| | | | | |
|---|---|---|---|---|
| 2011/0207436 A1* | 8/2011 | van Gent | H04L 51/224 | 455/466 |
| 2011/0313784 A1* | 12/2011 | Harvey | G16H 10/60 | 705/2 |
| 2012/0245957 A1* | 9/2012 | Mathison | G16H 10/60 | 705/3 |
| 2013/0191762 A1* | 7/2013 | Rajagopalan | H04L 51/52 | 715/753 |
| 2014/0229835 A1* | 8/2014 | Ravine | H04L 51/10 | 709/206 |
| 2014/0278968 A1* | 9/2014 | Strompolos | G06Q 30/0249 | 705/14.52 |
| 2014/0297759 A1* | 10/2014 | Mody | H04L 51/10 | 709/206 |
| 2015/0039685 A1* | 2/2015 | Lewis | H04L 51/224 | 709/204 |
| 2015/0127711 A1* | 5/2015 | Livingston | G06Q 30/02 | 709/202 |
| 2015/0350148 A1* | 12/2015 | Kenney | H04L 51/224 | 709/206 |
| 2016/0226926 A1* | 8/2016 | Singh | G06Q 10/10 | |
| 2016/0234267 A1* | 8/2016 | Hebbar | H04L 65/403 | |
| 2016/0306816 A1* | 10/2016 | Morales, Jr. | H04L 51/52 | |
| 2017/0093780 A1* | 3/2017 | Lieb | H04L 51/18 | |
| 2017/0134464 A1* | 5/2017 | Rao | G06Q 30/02 | |
| 2017/0257337 A1* | 9/2017 | Hampson | H04L 51/224 | |
| 2020/0186576 A1* | 6/2020 | Gopal | H04L 65/1069 | |
| 2020/0219025 A1* | 7/2020 | Conte | G06Q 10/0637 | |
| 2021/0105233 A1* | 4/2021 | Tran | H04L 51/226 | |
| 2021/0112105 A1* | 4/2021 | Jackson | H04L 67/53 | |
| 2021/0233655 A1* | 7/2021 | Silverstein | G16H 40/20 | |
| 2022/0335507 A1* | 10/2022 | Cracco | G06Q 30/0641 | |
| 2022/0337898 A1* | 10/2022 | Dorogusker | G06Q 50/01 | |
| 2022/0413659 A1* | 12/2022 | Demmer | H04L 51/04 | |
| 2023/0034232 A1* | 2/2023 | Lee | H04L 51/04 | |
| 2023/0376998 A1* | 11/2023 | Pranger | G06Q 30/0252 | |
| 2024/0205483 A1* | 6/2024 | McBeth | G06Q 50/01 | |

OTHER PUBLICATIONS

Korostelev, Michael, et al. "M 2-pass: Sms-based mobile patient support and responding to challenges of transitional care." 2014 7th International Conference on Biomedical Engineering and Informatics. IEEE, 2014. (Year: 2014).*

Peuchot, Jeremy, et al. "Efficiency of text message contact on medical safety in outpatient surgery: retrospective study." JMIR mHealth and uHealth 8.9 (2020): e14346. (Year: 2020).*

* cited by examiner

100

Content
106

Creator
102

Server
101

Uploaded Content
107

Content Piece
108

Communication
Channel
105

Messages
109

Access Request
110

Follow-up Message
111

104A 104B　　104C

104D

Subscriber
Group
103

*700*

*Server*
*900*

*Entry*
*902*

*Entry*
*903*

| *Content* *905* | *Time Threshold* *906* | *Access Flag* *907* | *Group Identifier* *908* |
|---|---|---|---|

*Entry*
*904*

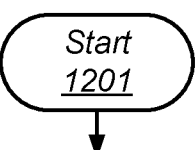

Start
1201

Uploading a plurality of pieces of content to a server, wherein the plurality of pieces of content is associated with a communication channel
1202

Sending a plurality of messages to corresponding ones of a plurality of subscribers to the communication channel, wherein the plurality of messages includes a link to a given piece of content of the plurality of pieces of content
1203

Monitoring access to a particular piece of content of the plurality of pieces of content
1204

In response to determining the particular piece of content has been accessed, sending a follow-up message to a particular subscriber of the plurality of subscribers
1205

End
1206

FIG. 12

CONTENT MANAGEMENT AND DELIVERY FOR A COMMUNICATION CHANNEL

TECHNICAL FIELD

This disclosure relates to content delivery services and, more particularly, to managing and delivering content to subscribers to a communication channel.

BACKGROUND

Businesses, schools, individual content creators, and the like, manage distribution of content and communication with subscribers using a variety of tools and platforms. In some cases, content may be created and uploaded to a web-service provider, which a subscriber can access via internet browser software. Communication with subscribers may be performed using a separate electronic mail ("e-mail") server.

SUMMARY

Various embodiments of a method for managing and delivering content via a communication channel are disclosed. Broadly speaking, a method may include uploading, to a server, a plurality of pieces of content that are associated with a communication. The method also includes sending a plurality of message to corresponding ones of a plurality of subscribers to the communication channel. The plurality of messages may include a link to a given piece of content of the plurality of pieces of content. Additionally, the method includes monitoring access to a particular piece of content and, in response to determining the particular piece of content has been accessed, sending a follow-up message to a particular subscriber.

BRIEF DESCRIPTION OF THE DRAWINGS

The following detailed description makes reference to the accompanying drawings, which are now briefly described.

FIG. 9 is a block diagram of a server storing multiple content entries.

FIG. 12 is a flow diagram depicting an embodiment of a method for operating a server included in a content management and delivery system.

DETAILED DESCRIPTION

Managing and delivering content to multiple groups of subscribers can be challenging. Businesses, schools, healthcare companies, and individual content creators can have different needs resulting in a patchwork of platforms. Different ones of the platforms may handle different portions of an overall service. For example, a web-services platform may be used to generate and maintain online content, while mass e-mail platform may be used to contact all subscribers to a particular collection of content.

In some cases, tailoring content to individual or small groups of subscribers may involve changes across multiple platforms that can incur significant time and money. Moreover, some subscriber contact options, e.g., e-mail messages, are often ignored by subscribers resulting in missed opportunities for time-sensitive content.

The embodiments described herein may provide techniques to consolidate management and delivery of content on a single platform. By employing a server configured to allow a creator to upload and organize content, the process of generating, managing, and delivering content can be simplified, saving time and money. Moreover, allowing for easy identification of portions of uploaded content that have associated subscription or access fees, monetization of the uploaded content can also be simplified, further saving on time and money. A communication channel based system can also potentially improve subscriber acknowledgment of notifications, thereby improving return on investment of the uploaded content.

Figure 1:
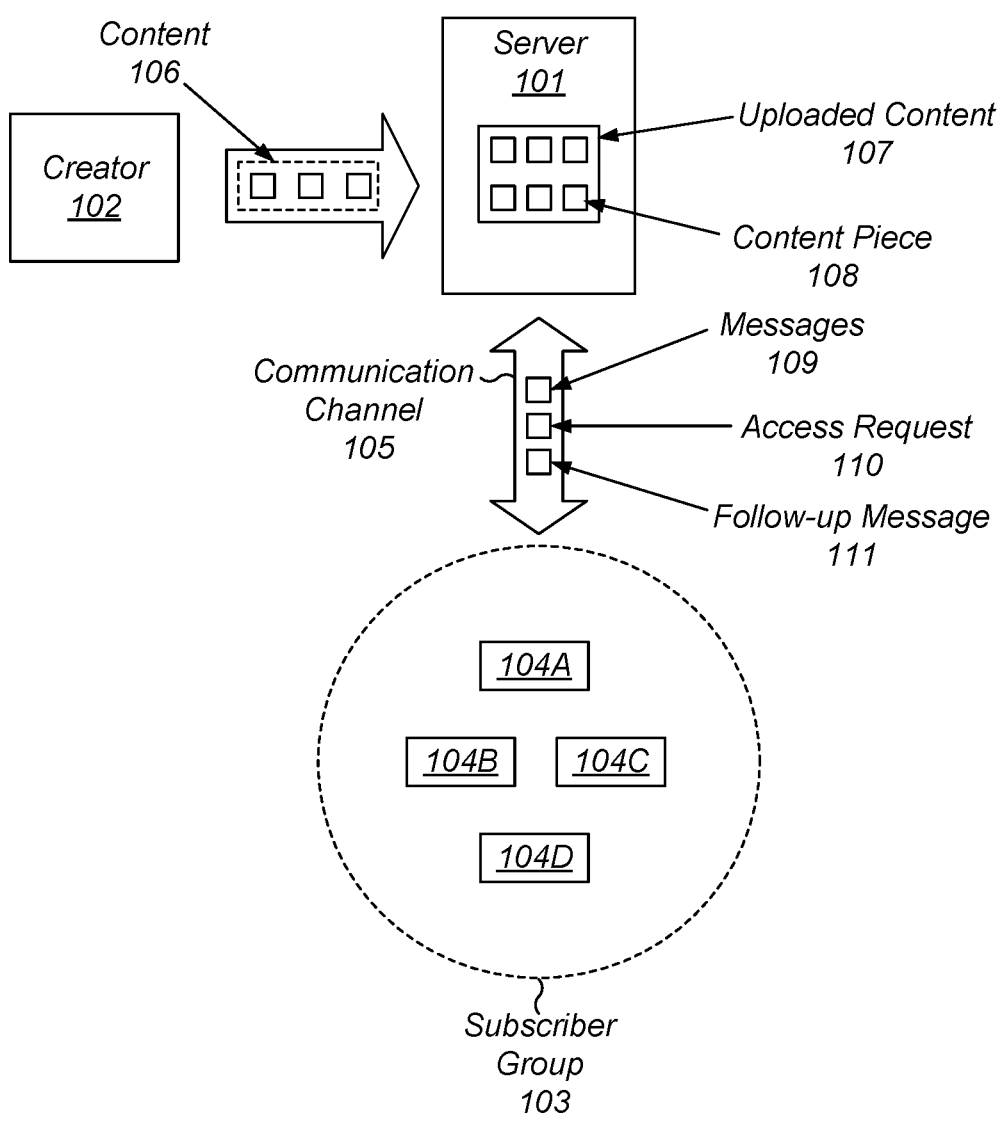
FIG. 1 is a block diagram of a content management and delivery system.

A block diagram of a content management and delivery system is depicted in FIG. 1. As illustrated, content management and delivery system 100 includes server 101 and subscriber group 103, which includes subscribers 104A-104D who are subscribed to communication channel 105. It is noted that although only a single communication channel is depicted in FIG. 1, in other embodiments, server 101 may be configured to manage multiple communication channels.

Server 101 is configured to receive content 106 uploaded by creator 102. In various embodiments, content 106 may include multiple pieces of content associated with communication channel 105. As described below, creator 102 may organize one or more of the pieces of content 106 into one or more pages. Additionally, creator 102 may add properties or tags to any of the pieces of content 106, or any generated pages that can specify levels of access, cost to access, or any other suitable properties.

Server 101 is further configured to send messages 109 to corresponding ones of subscribers 104A-104D. In various embodiments, messages 109 may include a link to one or more pieces of uploaded content 107. Server 101 may be configured to send messages 109 via communication channel 105 using Short Message Service (SMS) or any other suitable communication protocol. It is noted that communication channel 105 may, in some embodiments, employ more than one communication protocol.

Server 101 may be further configured to monitor access to content piece 108 of uploaded content 107. In response to a determination that content piece 108 has been accessed by a particular one of subscribers 104A-104D, server 101 may be configured to send follow-up message 111 via communication channel 105 to the particular one of subscribers 104A-104D. In some embodiments, follow-up message 111 may include a link to a different piece of content of uploaded content 107.

In some embodiments, server 101 may also be configured to receive access request 110 from a given one of subscribers 104A-104D, where access request 110 includes a request to access a given piece of uploaded content 107. As described below, server 101 may check properties associated with the given piece of uploaded content 107 to determine whether or not the given one of subscribers 104A-104D is allowed to access the given piece of uploaded content 107.

Figure 2:
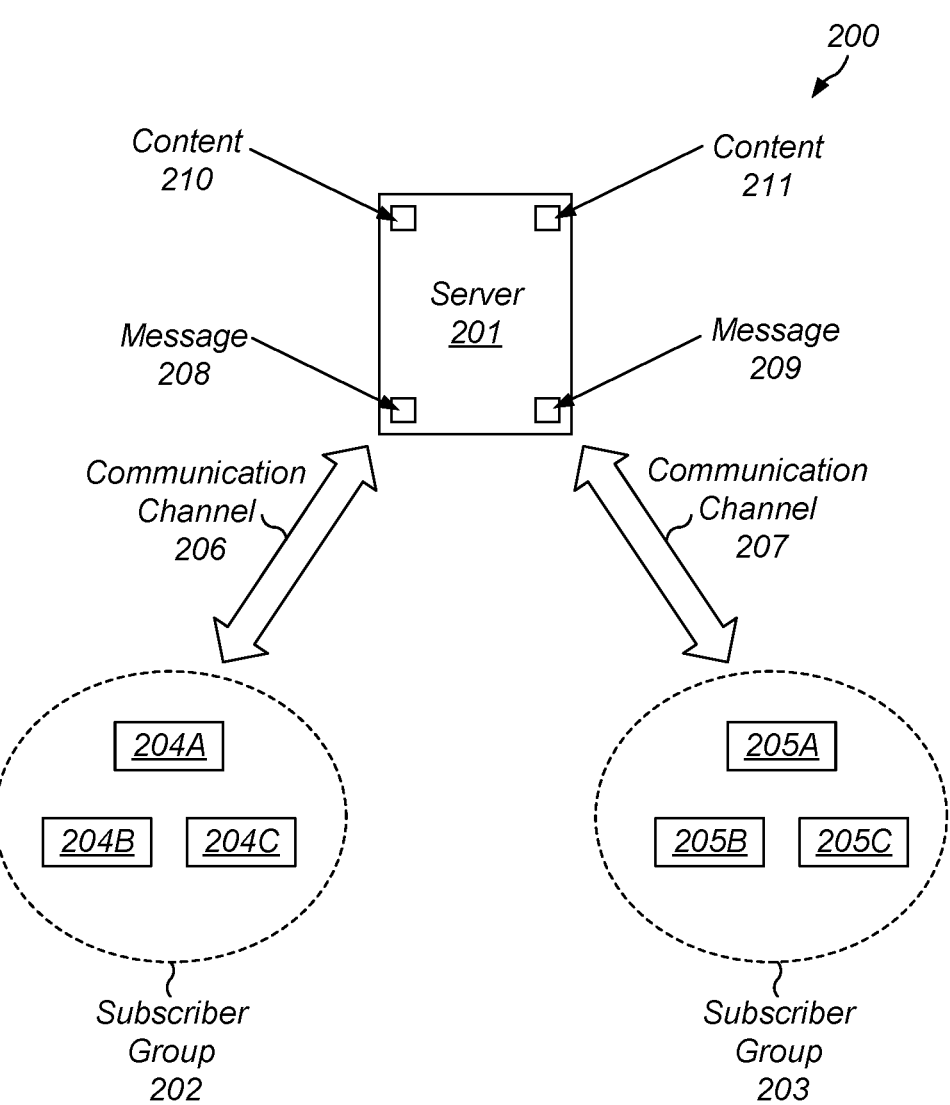
FIG. 2 is a block diagram of an embodiment of a content management and delivery system coupled to multiple communication channels for use with a content management and delivery system.

Turning to FIG. 2, a block diagram of a content management and delivery system including multiple communication channels is depicted. As illustrated, server 201 is coupled to communication channels 206 and 207. In various embodiments, server 201 may correspond to server 101 as depicted in FIG. 1.

Subscriber group 202 includes subscribers 204A-204C which subscribe to communication channel 206. In a similar fashion, subscriber group 203 includes subscribers 205A-205C which subscribe to communication channel 207. It is noted that although only two communication channels and two subscriber groups are depicted in the embodiment of FIG. 2, in other embodiments, any suitable number of communication channels and corresponding subscriber groups may be employed. It is further noted that although only three subscribers are depicted as being included in each of subscriber groups 202 and 203, in other embodiments, any suitable number of subscribers may be included in a subscriber group. It is also noted that a given subscriber, e.g., subscriber 204A, may be subscribed to multiple communication channels.

In various embodiments, server 201 may be configured to send message 208 to subscribers 204A-204C, and send message 209 to subscribers 205A-205C. In some embodiments, message 208 may include a link to content 210, while message 209 may include a link to content 211. In other embodiments, content 210 and content 211 may be shared by subscriber groups 202 and 203, in which case either of messages 208 and 209 may include links to both content 210 and 211. It is noted that server 201 may send messages 208 and 209 using SMS, or any other suitable communication protocol.

Figure 3:
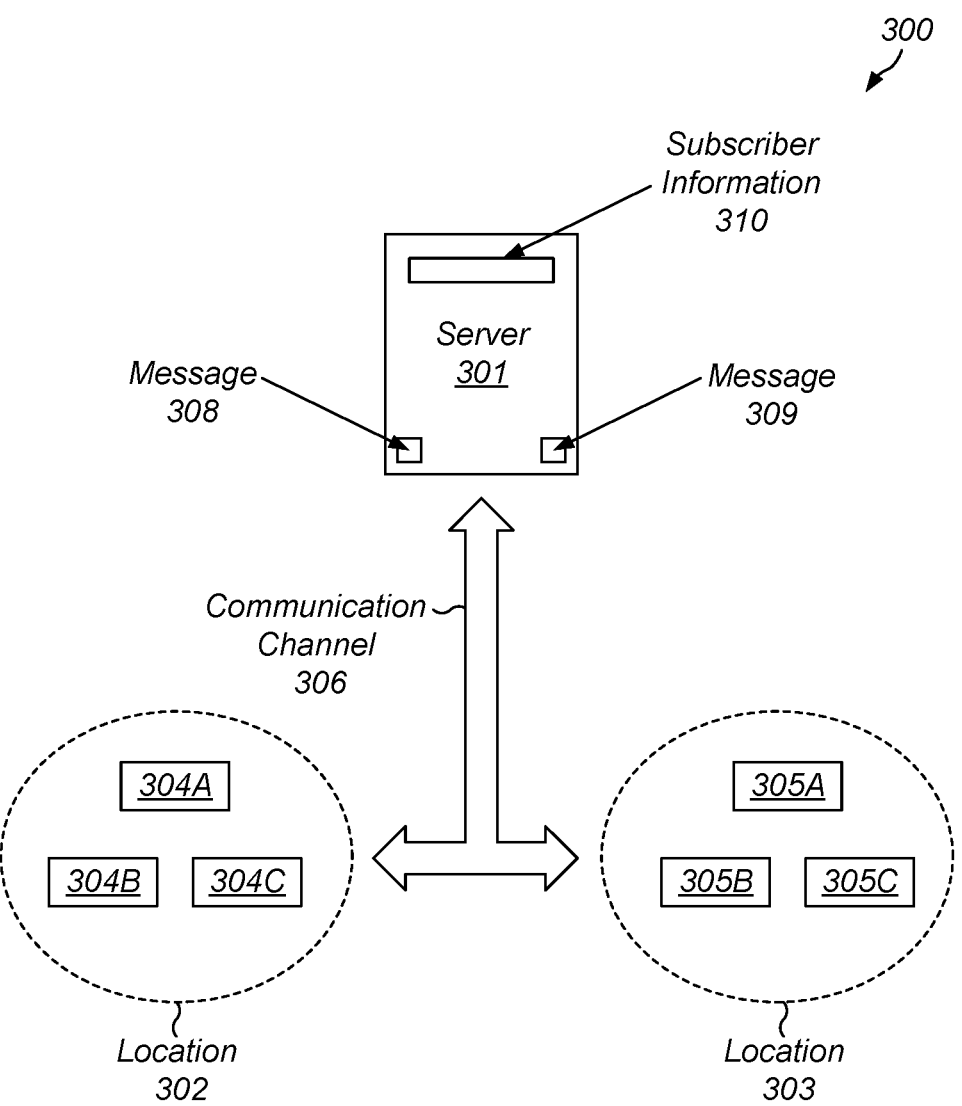
FIG. 3 is a block diagram of an embodiment of a content management and delivery system managing content for different geographic locations.

A block diagram of an embodiment of a content and management delivery system that includes server to manage content delivery for different geographic locations is depicted in FIG. 3. As illustrated, content management and delivery system 300 includes server 301 and subscribers 304A-304C and 305A-305C. In various embodiments, server 301 may correspond to server 101 as depicted in FIG. 1.

Subscribers 304A-304C are located at location 302, while subscribers 305A-305C are located at location 303. Subscribers 304A-304C and 305A-305C are subscribed to communication channel 306. In various embodiments, locations 302 and 303 may correspond to counties, cities, states, countries, or any other suitable geographic location. Information indicative of a subscriber's location may be stored in subscriber information 310 stored on server 301. In some cases, a given one of subscribers 304A-304C and 305A-305C may update their location in response to traveling from one geographic location to another.

Server 301 is configured to send message 308 to subscribers 304A-304C via communication channel 306, and send message 309 to subscribers 305A-305C via communication channel 306. In various embodiments, message 308 may include information specific to location 302, while message 309 may include information specific to location 303. For example, message 308 may include information indicative of a particular concert date in a particular city corresponding to location 302, while message 309 may include information indicative of a different concert date in a different city corresponding to location 303.

Although the embodiment depicted in FIG. 3 describes sending messages based on geographic locations, in other embodiments, messages may be sent by server 301 based on any suitable information available in subscriber information 310. For example, in some embodiments, subscriber information 310 may include corresponding ages for subscribers 304A-304C and 305A-305C, and server 301 may be configured to send different messages to different age groups of subscribers 304A-304C and 305A-305C. In other embodiments, subscriber information 310 may include medical information (e.g., prescriptions, surgical information, diagnosed diseases, etc.) for subscribers 304A-304C and 305A-305C, which can be used to identify one or more subscribers for message delivery. In other embodiments, combinations of subscriber information (e.g., subscribers over a certain age located in a particular city) may be used to identify subscribers for message delivery.

Figure 4:
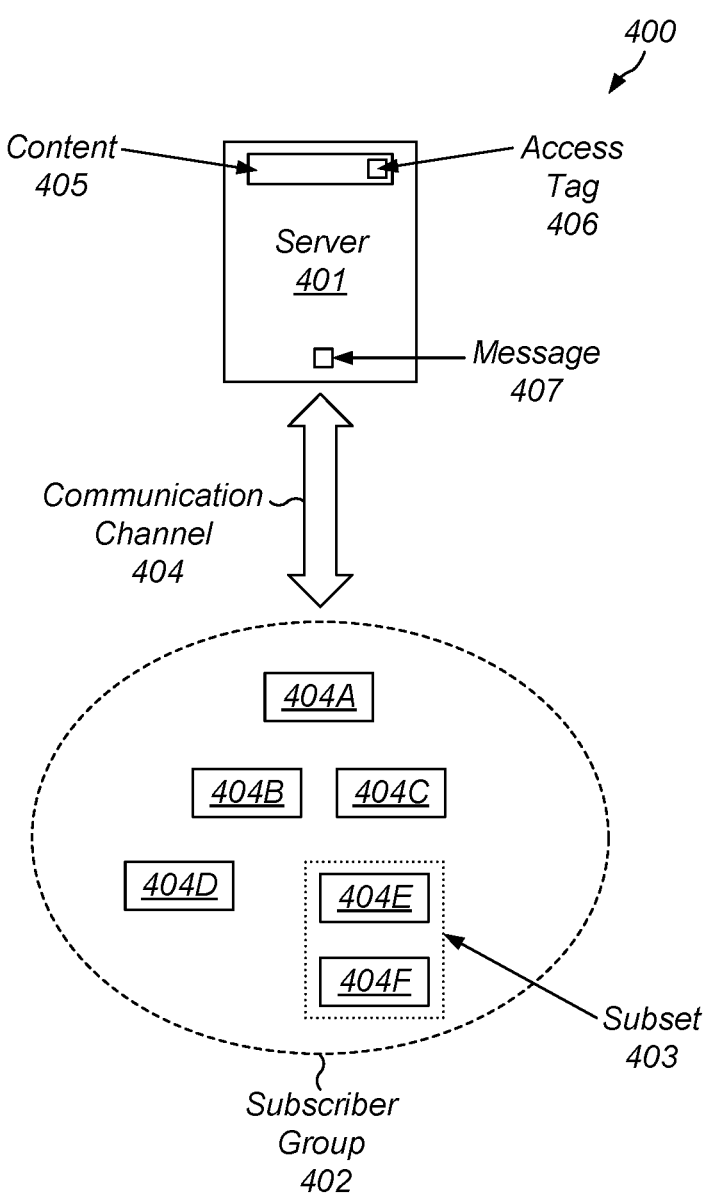
FIG. 4 is a block diagram of an embodiment of a content management and delivery system managing content for a subset of subscribers.

Turning to FIG. 4, a block diagram of an embodiment of a content management and delivery system that includes a server managing content for a subset of subscribers is depicted. As illustrated, content management and delivery system 400 includes server 401 and subscribers 404A-404F included in subscriber group 402. It is noted that server 401 may correspond to server 101 as depicted in FIG. 1.

Server 401 is configured to store content 405, which includes access tag 406. In various embodiments, access tag 406 includes information indicative of which of subscribers 404A-404F have accessed content 405. For example, access tag 406 may indicate that subscribers 404A-404D have accessed content 405, while subscribers 404E and 404F have yet to access content 405.

In various embodiments, server 401 is further configured to send, via communication channel 404, message 407 to subscribers 404E and 404F in response to a determination that subscribers 404E and 404F have not accessed content 405 based on access tag 406. Message 407 can include a reminder to access content 405.

By tracking access to a particular piece of content, server 401 can determine whether a particular subscriber has accessed a particular piece of content. For example, in some medical applications, post-operative surgical patients may be sent a message that links them to content that includes information for recovery, follow-up appointments, etc. If such a patient does not access that content, server 401, as described above, may be configured to send a reminder message to the patient, thereby increasing the likelihood that post-operative recovery goes smoothly.

Figure 5:
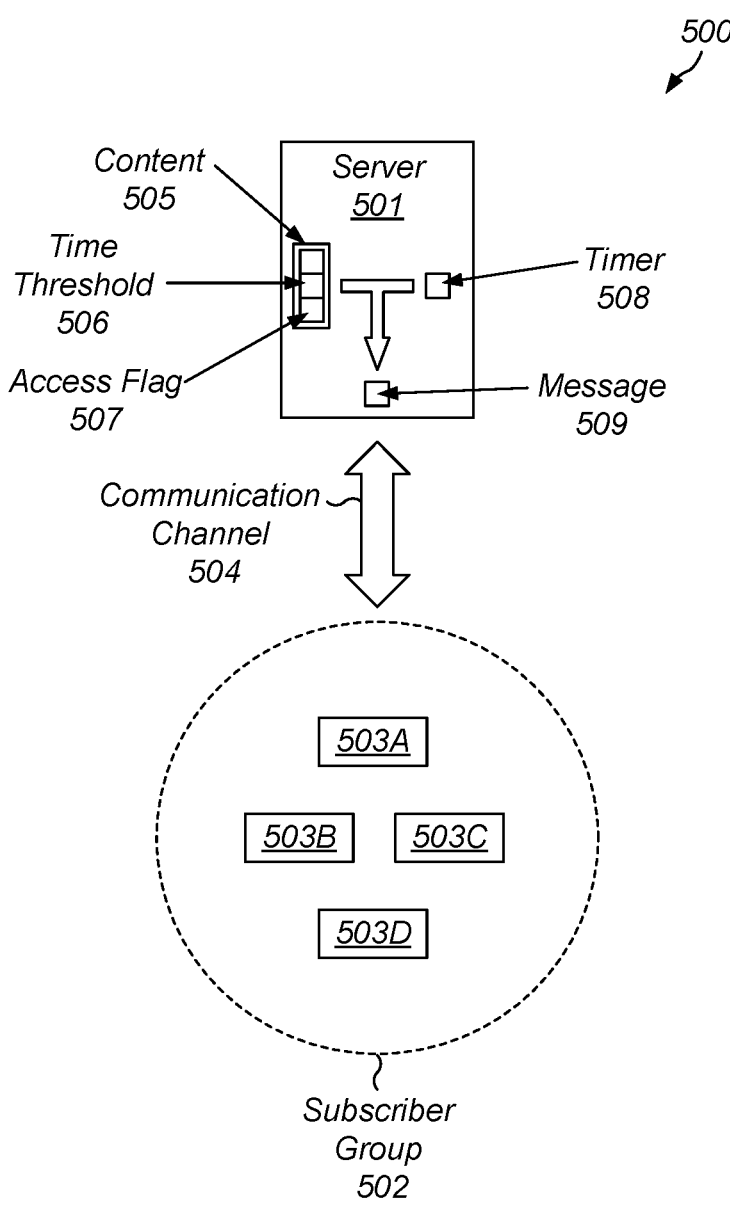
FIG. 5 is a block diagram of an embodiment of a content management and delivery system monitoring access time to a piece of content stored on a server.

Turning to FIG. 5, a block diagram of a content management and delivery system that monitors times at which content is accessed is depicted. As illustrated, content management and delivery system 500 includes server 501 and subscriber group 502. In various embodiments, server 501 may correspond to server 101 as depicted in FIG. 1.

Subscriber group 502 includes subscribers 503A-503D who are subscribed to communication channel 504. In various embodiments, any of subscribers 503A-503D can access content 505 in response to receiving a message from server 501.

Server 501 is configured to monitor access flag 507 of content 505 to determine whether or not content 505 has been accessed by particular ones of subscribers 503A-503D. In response to a determination that timer 508 exceeds time threshold 506 and access flag 507 indicates that content 505 has not been accessed, server 501 may be further configured to send message 509 to a given one of subscribers 503A-503D. In some embodiments, message 509 may include a reminder to access content 505.

In various embodiments, access flag 507 may include information indicative of which of subscribers 503A-503D have accessed content 505. In such cases, server 501 may track time to access content 505 on a per subscriber basis. When a value of timer 508 exceeds time threshold 506, server 501 may send reminder messages to only subscribers who have not accessed content 505.

Although only a single piece of content is depicted in the embodiment of FIG. 5, in other embodiments server 501 may be configured to store any suitable number of pieces of content. It is noted that although content 505 is depicted as having a single time threshold, in other embodiments, content 505 may include multiple time thresholds which can trigger different reminder messages being sent as the multiple time thresholds are exceeded.

Figure 6:
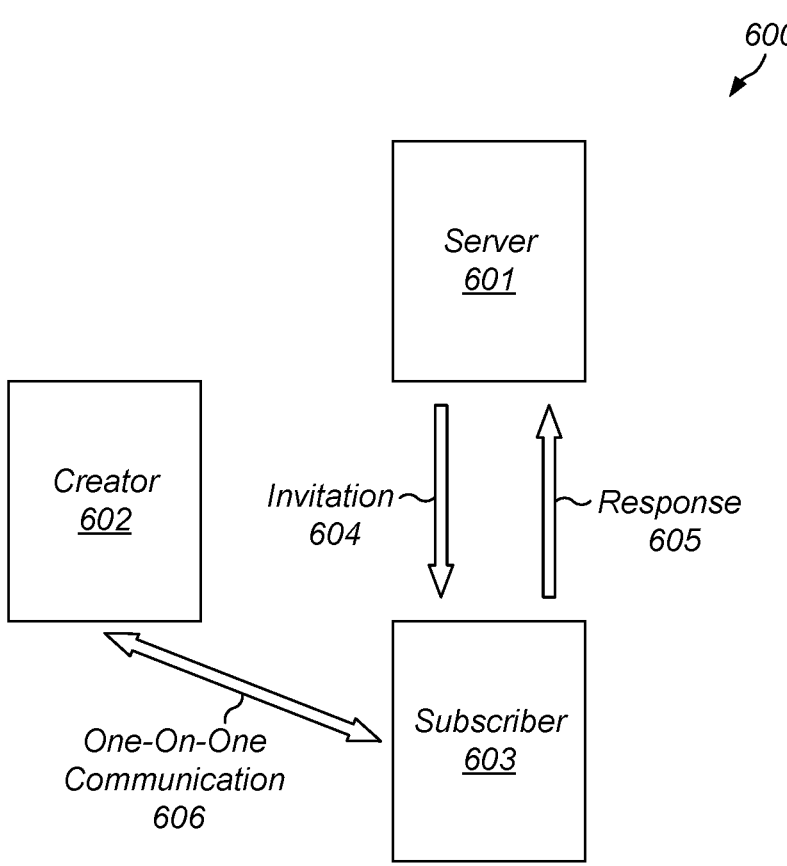
FIG. 6 is a block diagram depicting an embodiment of a content management and delivery system managing one-on-one communication between a creator and a subscriber.

Turning to FIG. 6, a block diagram of a content management and delivery system that includes one-on-one communication is depicted. As illustrated, content management and delivery system 600 includes server 601, creator 602, and subscriber 603. Although only one creator and one subscriber are depicted in the embodiments of FIG. 6, in other embodiments, content management and delivery system 600 may include any suitable number of creators and subscribers.

Server 601 may be configured to send invitation 604 to subscriber 603. In various embodiments, invitation 604 may include an invitation to participate in one-on-one communication 606 with creator 602. Server 601 may be configured to send invitation 604 via SMS or any other suitable communication protocol. In some embodiments, server 601 may be configured to send invitation 604 in response to a determination that a particular condition has been met. For example, server 601 may send invitation 604 in response to a determination that a particular piece of content stored on server 601 has not been accessed within a specified period of time.

Subscriber 603 can respond to invitation 604 with response 605. In various embodiments, response 605 may be an affirmative or negative response to the invitation for one-on-one communication 606 with creator 602. Subscriber 603 can send response 605 using SMS or any other suitable communication protocol.

Server 601 is configured, in response to a determination that response 605 is an affirmative response, to initiate one-on-one communication 606 between creator 602 and subscriber 603. In various embodiments, to initiate one-on-one communication 606, server 601 may be further configured to send a message to creator 602 indicating that response 605 is affirmative so that creator 602 can contact subscriber 603. Alternatively, server 601 may setup a tele-conference and send links to participate in the tele-conference to both creator 602 and subscriber 603.

Figure 7:
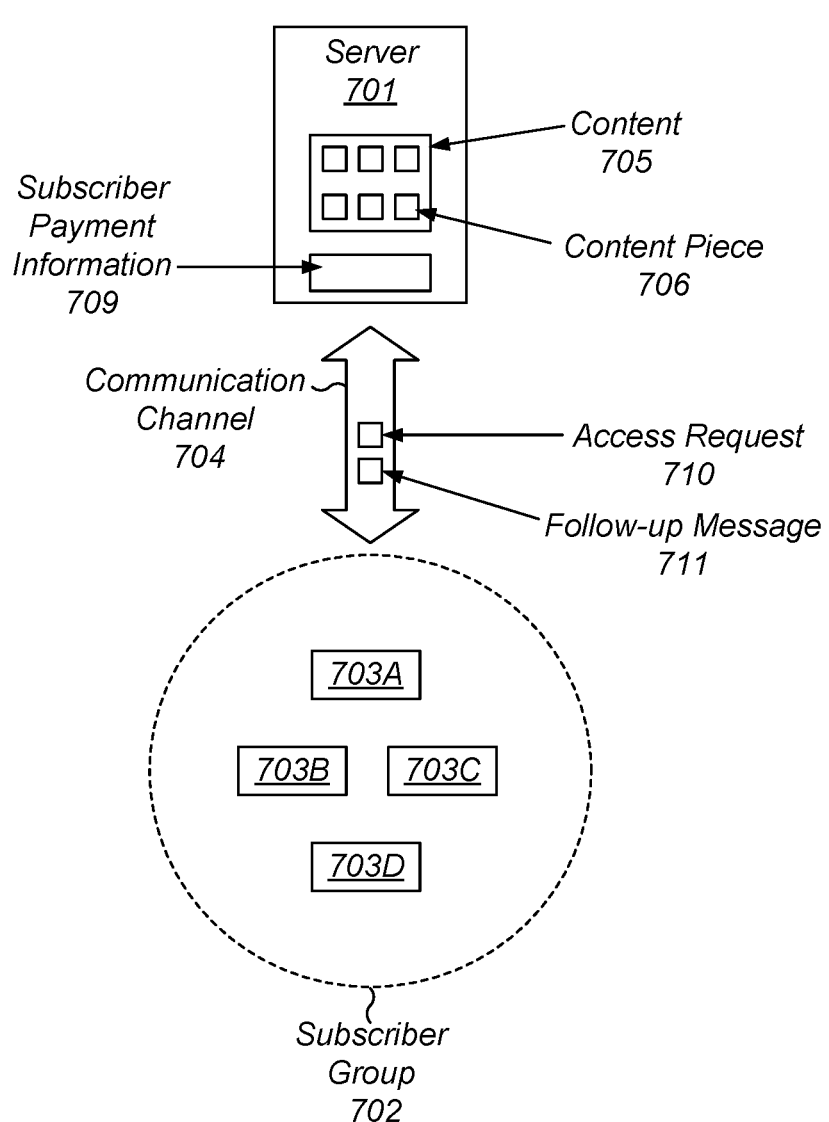
FIG. 7 is a block diagram depicting an embodiment of a content management and delivery system checking payment information prior to providing access to a piece of content stored on a server.

Turning to FIG. 7, a block diagram of a content management and delivery system for tracking payment information is depicted. Content management and delivery system 700 includes server 701, and subscriber group 702 that includes subscribers 703A-703D who are subscribed to communication channel 704. Although only a single subscriber group and communication channel is depicted in FIG. 7, in other embodiments, any suitable number of communication channels and corresponding subscriber groups may be managed by server 701.

In various embodiments, a particular one of subscribers 703A-703D may send access request 710 to server 701 via communication channel 704 to access content piece 706 included in content 705 stored on server 701. It is noted that, in some embodiments, access request 710 may take the form of a "click" on a link included in other pieces of content 705. In response to receiving access request 710, server 701 is configured to check cost information associated with content piece 706. If the cost information indicates that a certain fee is associated with content piece 706, server 701 is configured to check subscriber payment information 709 to determine whether or not the particular one of subscribers 703A-703D has made the necessary payment to access content piece 706.

In cases where the particular one of subscribers 703A-703D has made the necessary payment to access content piece 706, server 701 is configured to grant access to content piece 706. Alternatively, in cases where the particular one of subscribers 703A-703D has not paid to access content piece 706, server 701 will not grant access to content piece 706 and will send follow-up message 711 via communication channel 704 to the particular one of subscribers 703A-703D. In some cases, follow-up message 711 may include a notification that access cannot be granted and provide a link to a page or site where payment can be made.

Figure 8:
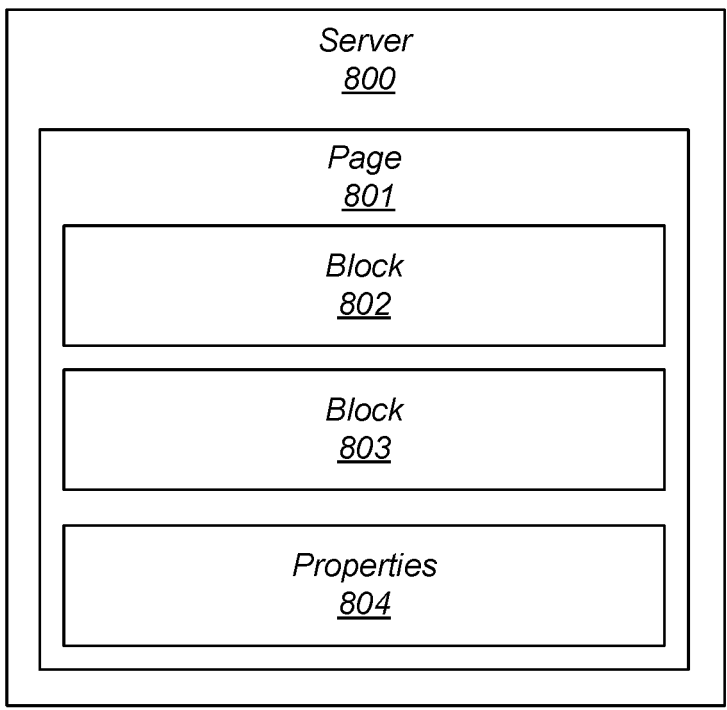
FIG. 8 is a block diagram depicting a page of content stored on a server included in a content management and delivery system.

In some cases, once a creator has uploaded content to a server, the creator can organize and present the content as one or more pages. A block diagram of a server storing a page of content is depicted in FIG. 8. As illustrated, server 800 is configured to store page 801. In various embodiments, server 801 may correspond to server 101 as depicted in FIG. 1. Although server 801 is depicted as storing a single page, in other embodiments, server 800 can be configured to store any suitable number of pages.

Page 801 includes block 802, block 803, and properties 804. Blocks 802 and 803 can include a variety of content uploaded by a creator (e.g., creator 102 as depicted in FIG. 1). In various embodiments, blocks 802 and 803 may include images, text, video, or any other suitable information. In various embodiments, the creator may arrange blocks 802 and 803 in an order to be displayed when a subscriber accesses page 801. In some embodiments, the creator may create and manipulate page 801 using a graphical user interface ("GUI") that accesses server 800. Although page 801 is depicted as including only two blocks, in other embodiments, page 801 may include any suitable number of blocks.

Properties 804 can, in various embodiments, include multiple properties applied to page 801. For example, in some cases, properties 804 may indicate a subscription level needed to access page 801. Alternatively, properties 804 may include a cost associated with an access to page 801. In some embodiments, properties 804 can include a recommendation for another page to access, time threshold information should information in blocks 802 and 803 be time sensitive, or any other suitable information relating to the content included in page 801.

Figure 9:
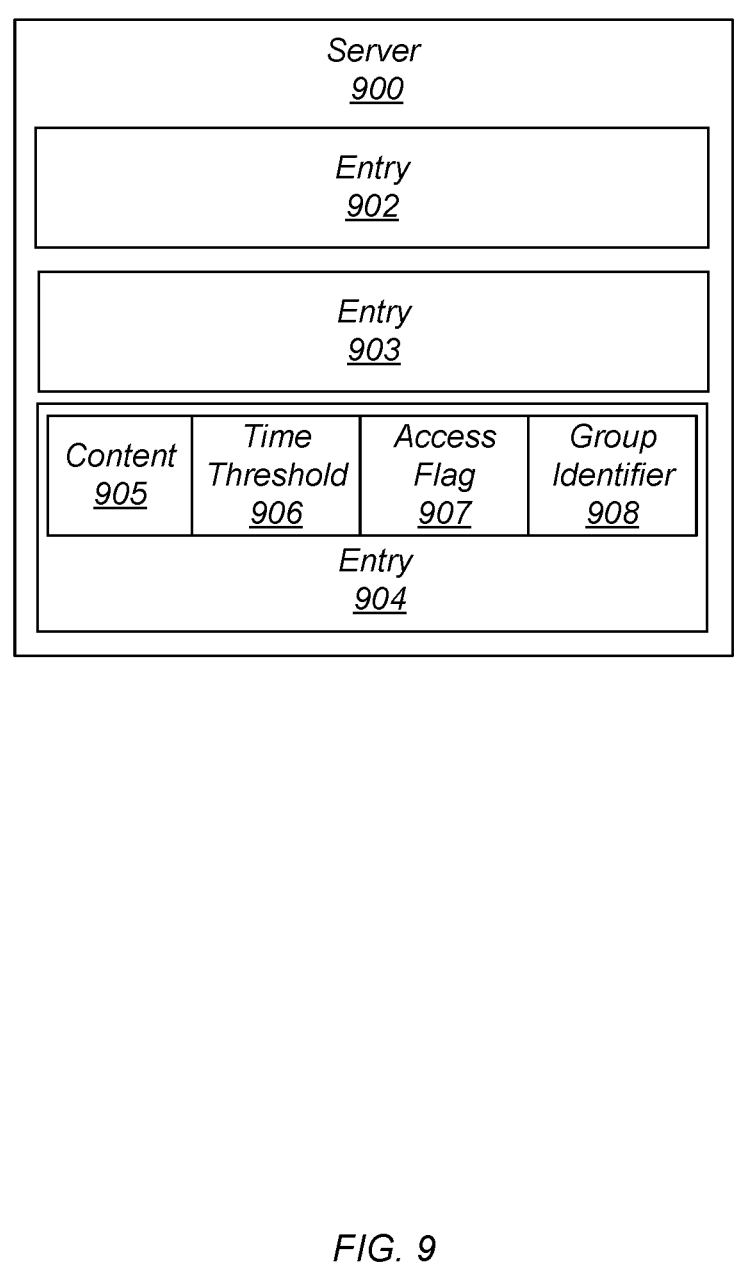

Turning to FIG. 9, a block diagram of a server storing multiple entries of content is depicted. As illustrated, server 900 is configured to store entries 902-904. It is noted that, in various embodiments, server 900 may correspond to server 101 as depicted in the embodiment of FIG. 1. Although server 900 is depicted as storing three entries, in other embodiments, server 900 can store any suitable number of entries.

Entry 904 includes content 905, time threshold 906, access flag 907, and group identifier 908. It is noted that, in various embodiments, the internal structure of entries 902 and 903 may be the same as entry 904, or may include any suitable subset of the type of information included in entry 904.

Content 905 can include a variety of data. In some cases, content 905 can include various media files (e.g., a MP3 file, a WAV file, or the like). In other cases, content 905 can include text or word processing files, spreadsheet files, or any suitable combination thereof.

Time threshold 906 includes data indicative of a particular duration of time. In some embodiments, time threshold 906 may correspond to time threshold 506 as depicted in FIG. 5, and may be used to send reminder messages when a time during which content 905 has not been accessed exceeds time threshold 906. In other embodiments, time threshold 906 may include data indicative of a future date that may be used to send reminder messages if content 905 has not been accessed by the future date included in time threshold 906.

Access flag 907 includes information indicative of which subscribers to a particular communication channel have accessed content 905. In various embodiments, a unique identifier corresponding to a particular subscriber may be added to access flag 907 by server 900 in response to the particular subscriber accessing content 905. In cases where content 905 is shared between multiple communication channels, the unique identifier may include data indicative of a communication channel to which the particular subscriber belongs.

Group identifier 908 includes information regarding subsets of a subscriber group for the communication channel associated with content 905. In various embodiments, group identifier 908 may identify which subscribers of the subscriber group have paid for access to content 905. Alternatively, group identifier 908 may include information identifying different subsets of the subscriber group associated with corresponding geographic locations.

It is noted that information stored in entry 904 is an example. In other embodiments, additional information, or different information, may be included with content 905.

Figure 10:
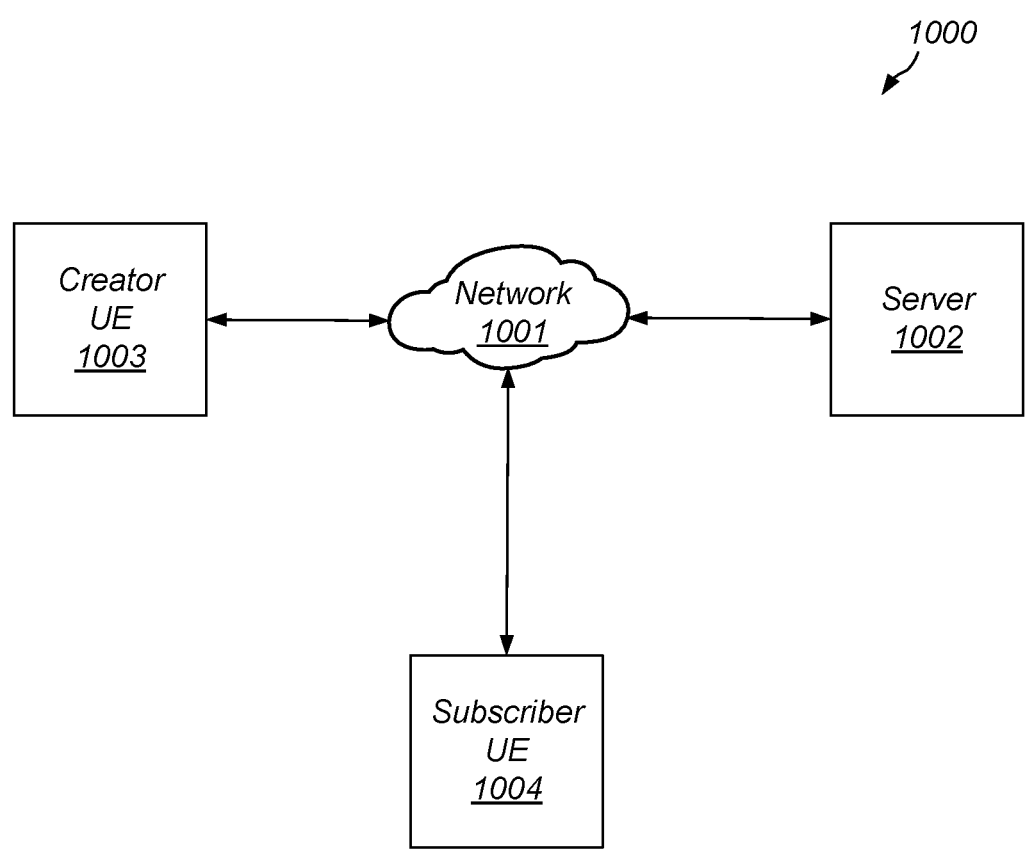
FIG. 10 is a block diagram depicting an embodiment of a network system.

Turning to FIG. 10, a block diagram of a network system is depicted. As illustrated, network system 1000 includes network 1001, server 1002, creator user equipment 1003 (denoted "creator UE 1003"), and subscriber user equipment 1004 (denoted "subscriber UE 1004"). Although only one creator UE and one subscriber UE are depicted in the embodiment of FIG. 10, in other embodiments, any suitable number creator UEs and subscriber UEs may be employed.

Network 1001 can be any type of network, such as, but not limited to, a wireless network, cellular network, the Internet, and the like. As disclosed herein, network 1001 can facilitate connectivity of server 1002, creator UE 1003, and subscriber UE 1004. In various embodiments, messages may be transmitted over network 1001 using any suitable communication protocol (e.g., SMS).

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular, or any combination thereof. Likewise, sub-networks, which may employ differing architectures, or may be compliant or compatible with differing protocols, may interoperate within a larger network.

Creator UE 1003 may be configured to upload content to server 1002 and manage uploaded content as described above. In some embodiments, creator UE 1003 may be configured to upload content via network 1001. In other embodiments, creator UE 1003 may upload content to server 1002 via a direct wired or wireless connection.

Server 1002 may, in various embodiments, correspond to server 101 as depicted in FIG. 1. In various embodiments, server 1002 may be configured to store multiple pieces of content which are associated with corresponding communication channels. Additionally, server 1002 may be configured to send messages to subscriber UE 1004, monitor access to content, or any of the other operations described above in regards to servers.

Subscriber UE 1004 may be configured to receive messages from server 1002. In some embodiments, subscriber UE 1004 may be configured to send acknowledgements to server 1002, as well as communicate with creator UE 1003 in a one-on-one communication session. In various embodiments, subscriber UE 1004 may be implemented using a mobile phone, tablet, laptop, personal computer, and the like. In some embodiments, subscriber UE 1004 may be equipped with a cellular, wireless, or wired transceiver depending on the implementation of network 1001.

Figure 11:
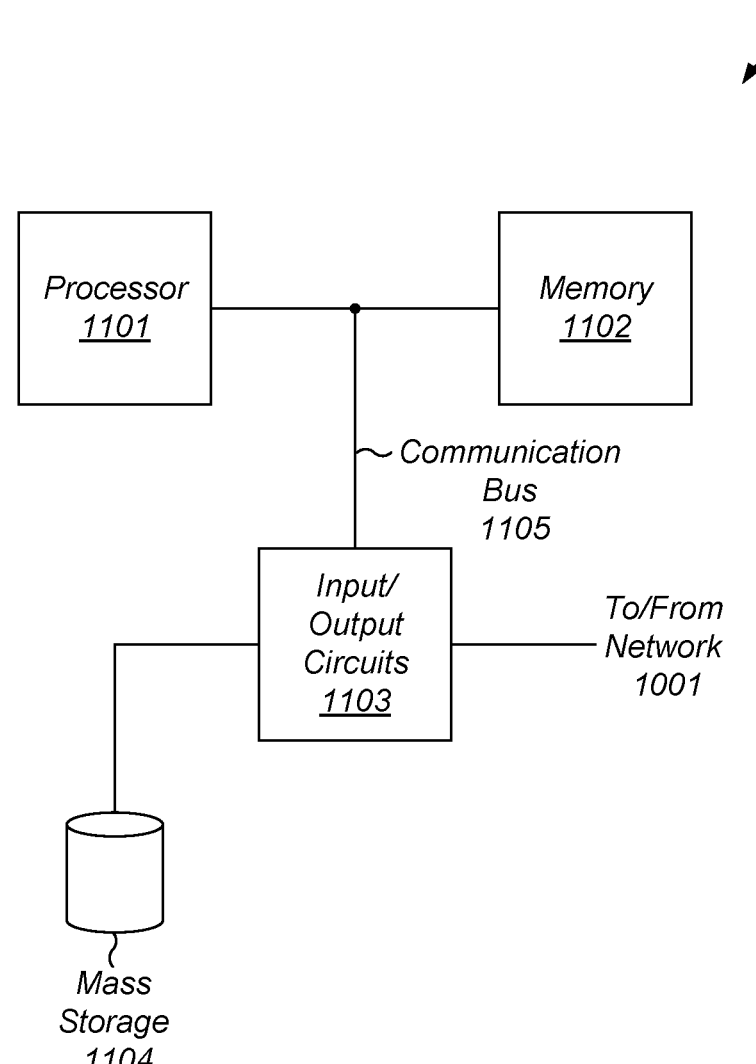
FIG. 11 is a block diagram depicting an embodiment of a computer system.

A block diagram of a computer system is depicted in FIG. 11. As illustrated, computer system 1100 includes processor 1101, memory 1102, input/output circuits 1103, and mass storage 1104. Processor 1101, memory 1102, and input/output circuits 1103 are coupled together via communication bus 1105. It is noted that in various embodiments, computer system 1100 may correspond to any of the servers or user equipment described above, and may be configured for use in a desktop computer, server, or in a mobile computing application such as a tablet, laptop computer, or wearable computing device.

Some computer systems may include additional components not shown, such as graphics processing unit (GPU) devices, cryptographic co-processors, artificial intelligence (AI) accelerators, or other peripheral devices. In cases where computer system 1100 corresponds to a UE (e.g., subscriber UE 1004), computer system 1100 may further include a display, keypad, an audio interface, and the like, to allow a user to interface with computer system 1100.

Processor 1101 may, in various embodiments, be representative of a general-purpose processor configured to perform various operations in response to executing program or software instructions. For example, processor 1101 may be a central processing unit (CPU) such as a microprocessor, a microcontroller, an application-specific integrated circuit (ASIC), or a field-programmable gate array (FPGA). While a single processor is depicted in the embodiment of FIG. 11, in other embodiments, multiple processors may be employed. It is noted that, in some embodiments, processor 1101 may include multiple processor cores configured to work in unison on independently to execute a program or software instructions.

Memory 1102 may, in various embodiments, include any suitable type of memory such as dynamic random-access memory (DRAM), static random-access memory (SRAM), read-only memory (ROM), electrically erasable program-mable read-only memory (EEPROM), non-volatile memory, for example. Although a single memory is depicted in the embodiment of FIG. 11, in other embodiments, any suitable number of memories may be employed.

Input/output circuits 1103 may be configured to coordi-nate data transfer between computer system 1100 and one or more peripheral devices, such as mass storage 1104. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1103 may be configured to implement a version of Universal Serial Bus (USB) protocol, IEEE 1394 (Firewire®) protocol, Peripheral Component Interface Express (PCIE), and the like.

Input/output circuits 1103 may also be configured to coordinate data transfer between computer system 1100 and one or more devices (e.g., other computing systems or integrated circuits) coupled to computer system 1100 via a network. In some embodiments, input/output circuits 1103 may be configured to perform the data processing necessary to implement an Ethernet (IEEE 802.3) networking standard such as Gigabit Ethernet or 10-Gigabit Ethernet, for example, although it is contemplated that any suitable net-working standard may be implemented. In some embodi-ments, input/output circuits 1103 may be configured to implement multiple discrete network interface ports.

Mass storage 1104 may include a non-transitory computer readable storage medium configured to store program or software instructions, as well as content uploaded by a creator. In some cases, mass storage 1104 may include an installation medium, e.g., a CD-ROM, floppy disks, or a tape device. Alternatively, or additionally, mass storage 1104 may include DRAM, double data-rate random-access memory (DDR RAM), SRAM, extended data out random-access memory (EDO RAM), Rambus RAM, or any other suitable type of memory. In various embodiments, mass storage 1104 may include non-volatile memory such as flash memory, magnetic media, e.g., a hard drive, or optical storage, registers, or other similar types of memory ele-ments, etc. It is noted that mass storage 1104 may include any suitable combination of the memory mediums described above, which may reside in different locations, e.g., different computer systems that are connected via a network.

Turning to FIG. 12, a flow diagram depicting an embodi-ment of a method for operating a server to manage and deliver content to subscribers is illustrated. The method, which may be applied to various servers, e.g., server 101 as depicted in FIG. 1, begins in block 1201.

The method includes uploading a plurality of pieces of content to a server (block 1202). In various embodiments, the plurality of pieces of content is associated with a communication channel. In different embodiments, upload-ing the plurality of pieces of content includes tagging at least one piece of content of the plurality of pieces of content with information indicative of a cost associated with accessing the at least one piece of content.

In some embodiments, uploading the plurality of pieces of content includes tagging at least one piece of content of the plurality of pieces of content with information indicative of a subset of the plurality of subscribers. In some cases, the information indicative of the subset of the plurality of subscribers includes geographical location information. The method may, in some embodiments, include sending respec-tive messages to the subset of the plurality of subscribers, where the respective messages include corresponding links to the at least one piece of content.

The method further includes sending a plurality of mes-sages to corresponding ones of a plurality of subscribers to the communication channel (block 1203). In various embodiments, the plurality of messages includes a link to a given piece of content of the plurality of pieces of content.

The method also includes monitoring access to a particu-lar piece of content of the plurality of pieces of content (block 1204). In some cases, monitoring access to the particular piece of content may include setting an access flag for the particular piece of content in response to determining that the particular piece of content being accessed. In some embodiments, the access flag may include information indicative of a particular subscriber that accessed the par-ticular piece of content. Alternatively, or additionally, the access flag may include information indicative of a number of times the particular subscriber accessed the particular piece of content.

The method further includes, in response to determining the particular piece of content has been accessed, sending a follow-up message to a particular subscriber of the plurality of subscribers (block 1205). In some embodiments, the follow-up message may include a link to a different piece of content. Alternatively, or additionally, the follow-up mes-sage may include an invitation to initiate one-on-one com-munication between the particular subscriber and a creator of the content. In other embodiments, sending the follow-up message includes sending a Short Message Service (SMS) message.

In some embodiments, the method may also include tracking an amount of time a different piece of content of the plurality of pieces of content remains un-accessed. In such cases, the method may additionally include, in response to determining that the amount of time exceeds a threshold value, sending a reminder message to a different subscriber of the plurality of subscribers.

In other embodiments, the method may further include receiving, from a given subscriber of the plurality of sub-scribers, a request to access the different piece of content of the plurality of pieces of content. In such cases, the method may also include checking payment information associated with the given subscriber prior to granting access to the different piece of content. The method concludes in block 1206.

The present disclosure includes references to "an embodi-ment" or groups of "embodiments" (e.g., "some embodi-ments" or "various embodiments"). Embodiments are dif-ferent implementations or instances of the disclosed concepts. References to "an embodiment," "one embodi-ment," "a particular embodiment," and the like do not necessarily refer to the same embodiment. A large number of possible embodiments are contemplated, including those specifically disclosed, as well as modifications or alterna-tives that fall within the spirit or scope of the disclosure.

"A", "an", and "the", as used herein, refers to both singular and plural referents unless the context clearly dictates otherwise. By way of example, "a processor" pro-grammed to perform various functions refers to one proces-sor programmed to perform each and every function, or more than one processor collectively programmed to per-form each of the various functions.

Numerous variations and modifications will become apparent to those skilled in the art once the above disclosure is fully appreciated. It is intended that the following claims be interpreted to embrace all such variations and modifica-tions.

What is claimed is:

1. A method, comprising:

receiving, from a creator at a server, a particular piece of content, wherein the server is configured to send a message about the particular piece of content or a link to access the particular piece of content, wherein the message is sent using a Short Message Service (SMS) communication protocol, and wherein the particular piece of content is associated with recovery or a follow-up appointment for post-operative surgical patients;

identifying, by the server, a subset of a plurality of subscribers that are post-operative surgical patients located within a particular geographical location;

sending, by the server, a plurality of messages to the subset of the plurality of subscribers using the SMS communication protocol, wherein each message of the plurality of messages includes the link to access the particular piece of content, wherein access to the particular piece of content is restricted based on payment information of the plurality of subscribers, and wherein the particular piece of content is associated with multiple time thresholds that trigger different reminder messages as the multiple time thresholds are exceeded;

monitoring, by the server, access to the particular piece of content by the plurality of subscribers, wherein accessing the particular piece of content by a particular subscriber in the plurality of subscribers modifies an access flag associated with the particular piece of content to include a unique identifier of the particular subscriber;

based on the unique identifier of the particular subscriber not being included with the access flag within a particular period of time, determining, by the server, the particular piece of content remains un-accessed by the particular subscriber for the particular period of time;

in response to determining that the particular piece of content remains un-accessed by the particular subscriber, sending, to the particular subscriber via the SMS communication protocol, an invitation to initiate one-on-one communication; and in response to receiving an affirmative response to the invitation from the particular subscriber, initiating a tele-conference between the particular subscriber and the creator of the particular piece of content.

2. The method of claim 1, further comprising:

tracking an amount of time a different piece of content remains un-accessed; and in response to determining that the amount of time exceeds a threshold value, sending a reminder message to a different subscriber of the plurality of subscribers.

3. The method of claim 1, further comprising:

tagging, by the server, the particular piece of content with information indicative of the subset of the plurality of subscribers.

4. The method of claim 3, wherein the information indicative of the subset of the plurality of subscribers includes geographical location information.

5. A non-transitory computer-accessible storage medium having program instructions stored therein that, in response to execution by a server, causes the server to perform operations including:

receiving a particular piece of content, wherein the server is configured to send a message about the particular piece of content or a link to access the particular piece of content, wherein the message is sent using a Short Message Service (SMS) communication protocol, and wherein the particular piece of content is associated with recovery or a follow-up appointment for post-operative surgical patients;

identifying a subset of a plurality of subscribers that are post-operative surgical patients located within a particular geographical location;

sending a plurality of messages to the subset of the plurality of subscribers using the SMS communication protocol, wherein each message of the plurality of messages includes the link to access the particular piece of content, wherein access to the particular piece of content is restricted based on payment information of the plurality of subscribers, and wherein the particular piece of content is associated with multiple time thresholds that trigger different reminder messages as the multiple time thresholds are exceeded;

monitoring access to the particular piece of content by the plurality of subscribers, wherein accessing the particular piece of content by a particular subscriber in the plurality of subscribers modifies an access flag associated with the particular piece of content to include a unique identifier of the particular subscriber;

based on a unique identifier associated with the particular subscriber not being included with the access flag within a particular period of time, determining that the particular piece of content remains un-accessed by the particular subscriber for the particular period of time;

in response to determining that the particular piece of content remains un-accessed, sending, to the particular subscriber using the SMS communication protocol, an invitation to initiate one-on-one communication; and in response to receiving an affirmative response to the invitation from the particular subscriber, initiate a tele-conference between the particular subscriber and the creator of the particular piece of content.

6. The non-transitory computer-accessible storage medium of claim 5, wherein the server is further configured to perform operations including:

receiving, from the particular subscriber, a request to access a different piece of content; and checking payment information associated with the particular subscriber prior to granting access to the different piece of content.

7. The non-transitory computer-accessible storage medium of claim 5, wherein the server is further configured to perform operations including:

tagging the particular piece of content with information indicative of a cost associated with accessing the particular piece of content.

8. The non-transitory computer-accessible storage medium of claim 5, wherein the server is further configured to perform operations including:

in response to determining the particular piece of content has been accessed, sending a follow-up message with a second link to a different piece of content.

9. The non-transitory computer-accessible storage medium of claim 5, wherein the server is further configured to perform operations including:

tracking an amount of time a different piece of content remains un-accessed; and in response to determining that the amount of time exceeds a threshold value, sending a reminder message to a different subscriber of the plurality of subscribers.

10. A system, comprising:

one or more memory circuits configured to store instructions; and one or more processors configured to receive instructions from the one or more memory circuits and execute the instructions to cause the system to perform operations comprising:

uploading a particular piece of content to a server, wherein the server is configured to send a message about the particular piece of content or a link to access the particular piece of content, wherein the message is sent using a Short Message Service (SMS) communication protocol, and wherein the particular piece of content is associated with recovery or a follow-up appointment for post-operative surgical patients;

identifying a subset of a plurality of subscribers that are post-operative surgical patients located within a particular geographical location;

sending a plurality of messages to the subset of the plurality of subscribers using the SMS communication protocol, wherein each message of the plurality of messages includes the link to access the particular piece of content;

wherein access to the particular piece of content is restricted based on payment information of the plurality of subscribers, and wherein the particular piece of content is associated with multiple time thresholds that trigger different reminder messages as the multiple time thresholds are exceeded;

monitoring access to the particular piece of content by the plurality of subscribers, wherein accessing the particular piece of content by a particular subscriber in the plurality of subscribers modifies an access flag associated with the particular piece of content to include a unique identifier of the particular subscriber;

based on a unique identifier associated with the particular subscriber not being included with the access flag within a particular period of time, determining that the particular piece of content remains un-accessed by the particular subscriber for the particular period of time;

in response to determining that the particular piece of content remains un-accessed, sending, to the particular subscriber using the SMS communication protocol, an invitation to initiate one-on-one communication; and in response to receiving an affirmative response to the invitation from the particular subscriber, initiating a tele-conference between the particular subscriber and the creator of the particular piece of content.

11. The system of claim 10, wherein the instructions further cause the system to perform operations comprising:

tracking an amount of time a different piece of content remains un-accessed; and in response to determining that the amount of time exceeds a threshold value, sending a reminder message to a different subscriber of the plurality of subscribers.

12. The system of claim 10, wherein the instructions further cause the system to perform operations comprising:

tagging the particular piece of content with information indicative of the subset of the plurality of subscribers.

13. The system of claim 12, wherein the information indicative of the subset of the plurality of subscribers includes geographical location information.

14. The system of claim 10, wherein the instructions further cause the system to perform operations comprising:

receiving, from the particular subscriber, a request to access a different piece of content; and checking payment information associated with the particular subscriber prior to granting access to the different piece of content.

* * * * *